United States Patent Office 3,103,428
Patented Sept. 10, 1963

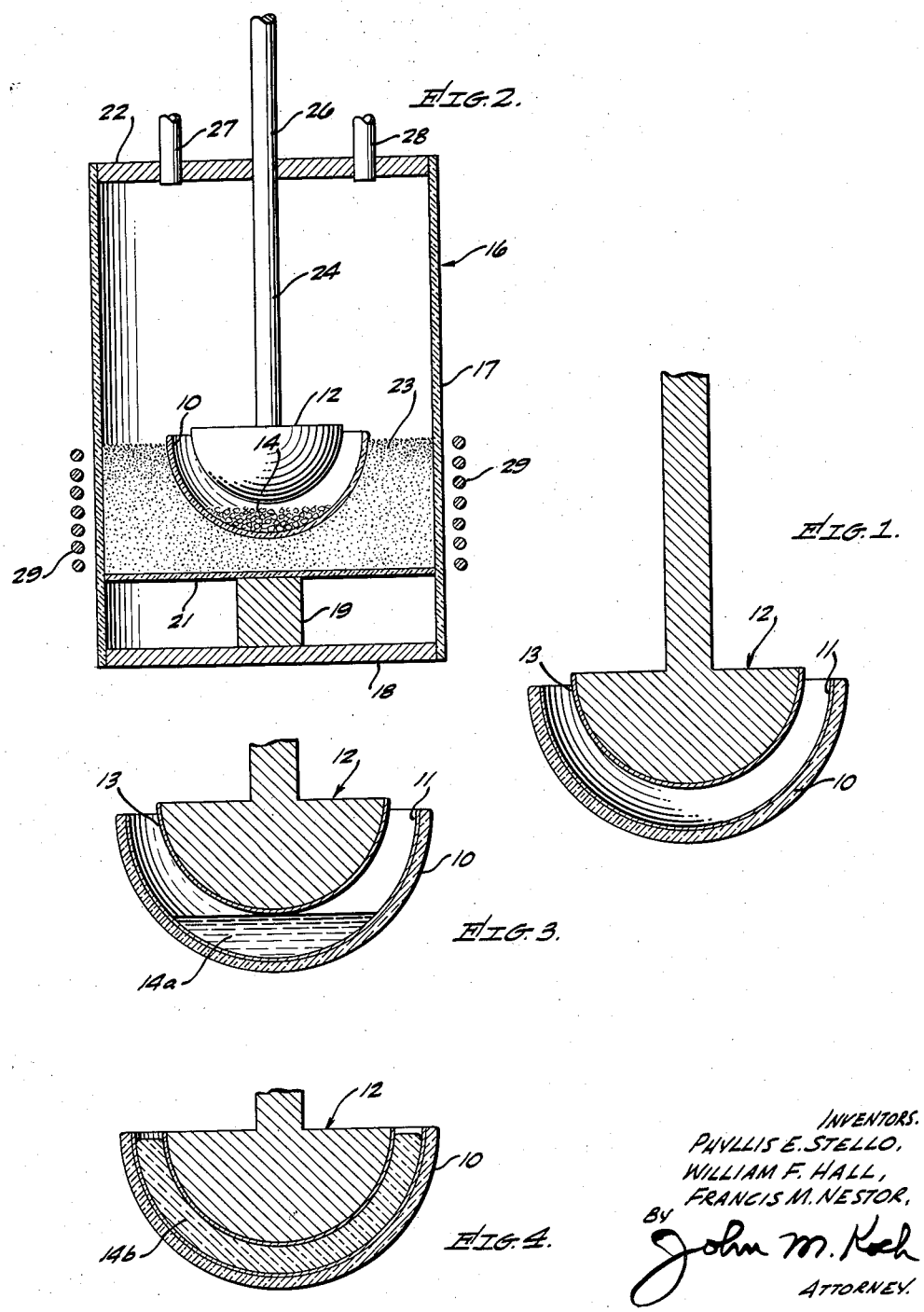

3,103,428
METHOD OF CASTING PURE SILICON SHAPES
Phyllis E. Stello, Newport Beach, and William F. Hall and Francis M. Nestor, Costa Mesa, Calif., assignors to Hughes Aircraft Company, Culver City, Calif., a corporation of Delaware
Filed Mar. 27, 1959, Ser. No. 802,458
2 Claims. (Cl. 65—68)

This invention relates to a method of forming silicon articles, especially very pure silicon optical components, by the use of a process involving a casting operation.

Silicon optical components are especially useful in infrared optical systems. Conventional optical glasses transmit infrared energy in varying degrees but have the important disadvantage of exhibiting a strong adsorption band at about 2.8 microns and, consequently, are limited to use below about 2.7 microns. The choice of suitable materials for use with infrared radiations above about 3 microns is limited, because, in addition to transmitting this longer wavelength infrared energy, the material also should have suitable physical and thermal characteristics and should be available in quantity.

Silicon has a much higher practical transmission limit than conventional optical glasses and has desirable physical properties. It has a high index of refraction and permits the use of spherical surfaces of less curvature for the same power than conventional glasses. Silicon is available in quantity but does present a problem because it is difficult to produce silicon components, such as windows, domes or lenses of optical quality, in the highly desired larger sizes and at economical prices. In the case of domes having a diameter of about 5 inches and larger, for example, it has been difficult to cast pure silicon domes free from cracks and other defects. Molten silicon wets quartz and most refractory materials that could be used to produce pure silicon castings. Largely because of this wetting characteristic of molten silicon, it has been found, in actual practice, to be extremely difficult to produce strong, sound, pure silicon castings. Such larger silicon domes have been made by growing a large single crystal of silicon and shaping the dome from the single crystal at great expense.

Accordingly, it is an important object of this invention to provide a method of producing strong castings of pure silicon free of cracks.

Another object is to provide a method of casting pure silicon shapes for forming optical components, such as windows, domes, lenses, and the like.

A further object is to provide an efficient method of producing larger size pure silicon domes suitable for use in infrared optical systems.

Additional objects will become apparent from the following description.

Stated in general terms, the objects of this invention are attained by casting silicon in a suitable mold wherein the internal molding surfaces are coated with silicon nitride. It has been found that molten silicon does not wet silicon nitride and the silicon casting does not stick to the internal, silicon nitride-coated surfaces of the mold. Excessive stresses are not produced in the silicon casting because it is relatively free to expand during solidification and it can cool and contract to a sufficient extent within the silicon nitride surface coating to avoid crack formation in the cast body. Furthermore, the silicon casting is not objectionably contaminated with impurities of the mold material or the silicon nitride.

A more detailed description of a specific embodiment of the invention is given below with reference to the drawing as applied to the production of a silicon dome for a large aperture infrared system. It will be understood, however, that this embodiment of the invention also can be used to cast silicon windows, lenses and other optical component shapes as well as articles for uses other than optical systems.

In the drawing:
FIG. 1 is a partial elevational view in section, showing a hemispherical plunger head positioned above a hemispherical crucible to form an adjustable mold;
FIG. 2 is a similar view schematically showing the adjustable mold of FIG. 1 charged with pieces of solid silicon and positioned inside an induction furnace;
FIG. 3 is a view similar to that of FIG. 1 showing the adjustable mold containing molten silicon; and
FIG. 4 is a view similar to that of FIG. 3 showing the molten silicon being cast in the shape of a hemispherical dome in the adjustable mold.

A hemispherical quartz crucible 10 of suitable size is sandblasted over its inner surface to provide a rough base for the adherence of a silicon nitride coating. This coating is applied by spraying a slurry of pure, powdered silicon nitride in pure water over the rough inner surface of the crucible to form a thin layer or coating 11 thereon. A slurry having about equal volumes of powder and water, or about 15 to 35 percent by weight of powder based on the slurry, has been found to have a sprayable consistency. The water is evaporated from the thin slurry layer by placing the crucible 10 in a drying oven at about 80° C. for about 5 minutes. The spraying and drying process is repeated, if necessary, to produce a uniformly opaque, evenly distributed adherent coating 11 of silicon nitride over the inner surface of the crucible.

A hemisphere or plunger head 12 of graphite having a radius somewhat shorter than that of the quartz crucible 10 is used with the crucible to complete the mold for casting the silicon dome body. The difference between the two radii is about equal to the thickness of the dome body. For a dome having a diameter of about 5 inches, for example, the thickness is about ¼ inch. The graphite from which the plunger head 12 is made preferably is of a grade such as CS-312 having a large linear coefficient of thermal expansion, such as about $12 \times 10^{-7}$ per degree centigrade, to aid in making a separation from the cast silicon dome, produced by the method of invention, without cracking the same. The plunger head 12 also is provided with a coating 13 of silicon nitride by repeatedly spraying the hemispherical surface thereof with thin layers of silicon nitride slurry and drying the layers in a drying oven as described above in producing the coating 11 on the inner surface of the crucible 10. The thickness of the coating 11 may be up to about 0.010 inch.

The silicon nitride lined crucible 10 is charged with a measured amount of pieces of pure silicon 14 and is lowered into a furnace 16, as shown in FIG. 2. The furnace 16 consists of a 6-inch diameter quartz tubular shell 17, a brass bottom plate 18 which seals off the bottom of shell 17, a zirconia pedestal 19, centrally supported on plate 18, a quartz plate 21, supported centrally on pedestal 19, and a brass top plate 22, sealing off the top of shell 17. A layer of several inches of pure silicon nitride powder 23 is placed on top of the quartz plate 21. Another suitable refractory powder may be used instead of silicon nitride powder. The crucible 10, containing the silicon 14 is pressed centrally into the silicon nitride powder 23 so that the powder comes within about ¼ inch of the top of the crucible and a thickness of about an inch of powder separates the bottom of the crucible from the upper surface of quartz plate 21.

The plunger head 12 is provided with a handle 24. This can be done by threading the lower end of the handle centrally into the flat, circular surface of the plunger head. The plunger head 12 is slidably mounted above crucible 10 in the furnace 16 with the plunger handle 24 slidable through a central guide hole 26 through the brass top plate 22. The top plate 22 also is provided with a gas inlet tube 27 and a gas outlet tube 28. An induction or work coil 29 made of 6 turns of ½ inch flattened copper tubing with an inside diameter of about 6¾ inches is mounted around the quartz shell 17 and the crucible 10, as shown in FIG. 2.

A pure, dry inert gas, such as helium or argon is flushed through the furnace via inlet tube 27 and outlet tube 28 while coil 29 is operated at low power to expedite the release and removal of air and moisture from inside the furnace. Cooling water is circulated through the coil 29 while it is supplied with electrical power. When sufficient flushing has taken place, coil 29 is operated at increased power sufficient to melt the silicon 14, as indicated at 14a in FIG. 3. The time required to heat and melt the silicon 14 is reduced by positioning the plunger head 12 so that the hemispherical surface thereof is only slightly above the silicon, as shown in FIGS. 2 and 3. In this position, radiant heat from the plunger head 12 reduces the time required to melt the silicon 14.

When the silicon 14 is melted, as indicated at 14a, the plunger head 12, which is at about 1300° C. at this stage, is lowered into the melt, which is at about 1500° C., to a predetermined depth as shown in FIG. 4. The inner, hemispherical, concave, silicon nitride coated surface 11 of the crucible 10 and the outer, hemispherical, convex, silicon nitride coated surface 13 of the plunger head 12 in effect serve as an adjustable mold and cause the molten silicon 14a to take on a hollow hemispherical dome shape, as indicated at 14b in FIG. 4. The plunger head 12 is fixed in position with the aid of a clamp (not shown) outside top brass plate 22.

At this point, the furnace 16 is lowered a short distance relative to the induction coil 29, which is maintained in a fixed position, so that the lip of the crucible 10 is approximately midway between the end turns of the induction coil 29. To facilitate this operation, the furnace preferably is supported on an adjustable jack (not shown). The power supplied to coil 29 is lowered slowly so that the molten silicon commences to solidify at the bottom of the crucible 10 and to expand upwardly as solidification takes place. In this manner, radial pressure acting on the crucible 10 is minimized and a minimum of radially directed strain develops in the solidifying expanding hollow silicon dome. Thus any tendency toward cracking the silicon dome is minimized.

The large coefficient of thermal expansion of the graphite plunger causes the plunger head 12 to contract as it cools and avoids the development of strains as the silicon dome 14b progressively solidifies and expands. Furthermore, the silicon nitride coatings 11 and 13 on the inside of crucible 10 and on the hemispherical surface of plunger head 12, respectively, prevent any wetting of these surfaces of the crucible and plunger head by the molten silicon and thus prevent any sticking of the solidifying silicon dome 14b to these surfaces. As a result, the silicon dome 14b freely slides over the adjacent silicon nitride surfaces as it expands and any tendency toward cracking the hollow hemispherical silicon dome due to this cause also is minimized.

The cooling rate preferably should be less than about 20° C. per minute to insure that solidification of the molten silicon progresses from the bottom of crucible 10 to the lip thereof. If liquid silicon is included in solid silicon, upon solidifying, this liquid silicon expands as it solidifies and cracks the surrounding solid silicon. By cooling in this manner, local liquid inclusions and resultant stresses and cracks are avoided. After the furnace and cast silicon dome approach room temperature, the case silicon dome is removed from the furnace. This is accomplished by removing the top plate 22 and then lifting crucible 10, the cast silicon dome 14b and the plunger head and handle 12, 24, as a unit from the furnace 16. The crucible 10 generally is not stuck to the casting at this point. In the event that it is stuck, it is readily separated from the casting by lightly tapping the crucible. The plunger handle 24 is unscrewed from the plunger head 12 and the casting with the plunger head therein is turned over so that the convex surface of the casting is upward and the plunger head is downward. The plunger head 12 then is tapped lightly around its periphery until it drops out of the casting. The crude, recovered cast silicon dome 14b is ground to the desired dimensions and its entire surface is polished by standard optical procedures.

In the detailed description of a specific embodiment of the invention given above, the silicon charge was introduced into the adjustable mold, consisting of the crucible 10 and plunger head 12, in solid form, and then melted in the mold. Alternatively, the silicon can be melted in a suitable container and then poured into the adjustable mold. Instead of an adjustable mold, a mold made of silicon nitride powder or sand can be used. Also, instead of using an inert gaseous atmosphere inside the mold, the silicon article or shape can be cast by the use of vacuum casting techniques wherein the inside of the mold is evacuated during the casting operation. Furthermore, special casting methods, such as centrifugal casting and die casting, for example, may be carried out by the use of the method of this invention by coating the molding surfaces with silicon nitride in a manner analogous to that described above. In other words, although the invention has been described and illustrated above in detail in connection with a specific application thereof, it will be apparent to persons skilled in the art that many modifications and variations can be made within the scope of the invention as defined in the appended claims.

What is claimed is:

1. The method of forming a dome-shaped silicon body comprising providing a hemispherical quartz mold member with a silicon nitride lining, introducing a charge of solid silicon into the quartz mold member, melting the silicon in the quartz mold member, providing a hemispherical graphite mold member with a silicon nitride coating, forming the concave and convex surfaces of the quartz and graphite mold members in generally concentric relationship with respect to each other, and casting the silicon into the shape of a dome between the concentric mold surfaces by gradually cooling and solidifying the molten silicon from the bottom to the top thereof.

2. The process of casting silicon into a predetermined shape comprising: providing cooperative mold members with a coating of silicon nitride, confining all but a surface portion of a mass of molten silicon between said mold members in contact with said coating, initiating solidification of said molten mass at a point remote from said surface portion, and causing said solidification to proceed progressively from said point to said surface portion.

References Cited in the file of this patent

UNITED STATES PATENTS

| 1,578,448 | Lebby | Mar. 30, 1926 |
| 2,201,049 | Moore | May 14, 1940 |
| 2,475,810 | Theurer | July 12, 1949 |

FOREIGN PATENTS

| 200,405 | Australia | July 21, 1955 |